US 012250178B2

(12) United States Patent
Zhang et al.

(10) Patent No.: US 12,250,178 B2
(45) Date of Patent: Mar. 11, 2025

(54) AUTOMATIC GAIN CONTROL (AGC) SYMBOL INDICATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/648,503

(22) Filed: Jan. 20, 2022

(65) Prior Publication Data

US 2023/0254101 A1 Aug. 10, 2023

(51) Int. Cl.
*H04L 5/14* (2006.01)
*H04W 72/23* (2023.01)
*H04W 72/542* (2023.01)

(52) U.S. Cl.
CPC ........... *H04L 5/1461* (2013.01); *H04W 72/23* (2023.01); *H04W 72/542* (2023.01)

(58) Field of Classification Search
CPC .... H04L 5/1461; H04W 72/23; H04W 72/542
See application file for complete search history.

(56) References Cited

U.S. PATENT DOCUMENTS

| | | | |
|---|---|---|---|
| 11,552,671 B2 * | 1/2023 | Lee | H04B 1/525 |
| 2019/0207738 A1 * | 7/2019 | Son | H04L 5/14 |
| 2021/0112472 A1 * | 4/2021 | Smith | H04W 36/08 |
| 2021/0273742 A1 * | 9/2021 | Xu | H04L 5/0094 |
| 2021/0410221 A1 * | 12/2021 | Zhang | H04L 5/14 |

FOREIGN PATENT DOCUMENTS

| WO | WO-2020186440 A1 * | 9/2020 | |
|---|---|---|---|
| WO | WO-2020214007 A1 * | 10/2020 | H04B 17/24 |

OTHER PUBLICATIONS

International Search Report and Written Opinion—PCT/US2023/060067—ISA/EPO—May 8, 2023.

* cited by examiner

*Primary Examiner* — Michael A Keller
(74) *Attorney, Agent, or Firm* — Patterson+ Sheridan, L.L.P.

(57) ABSTRACT

Aspects of the present disclosure provide techniques for techniques and apparatuses for mitigating self-interference (SI) at a wireless node engaging in full duplex (FD) communication. A method that may be performed by a network entity includes determining a trigger condition is satisfied for requesting an uplink (UL) signal from a user equipment (UE) for SI measurement, transmitting, to the UE, an indication to transmit the UL signal in one or more first symbols, wherein the one or more first symbols are prior to one or more second symbols for UL transmission by the UE, and wherein the one or more first symbols are scheduled for a downlink (DL) transmission by the network entity in a full duplex (FD) mode, measuring the UL signal, adjusting an automatic gain control (AGC) level based on the measurements, and using the adjusted AGC level to receive the UL transmission from the UE.

13 Claims, 12 Drawing Sheets

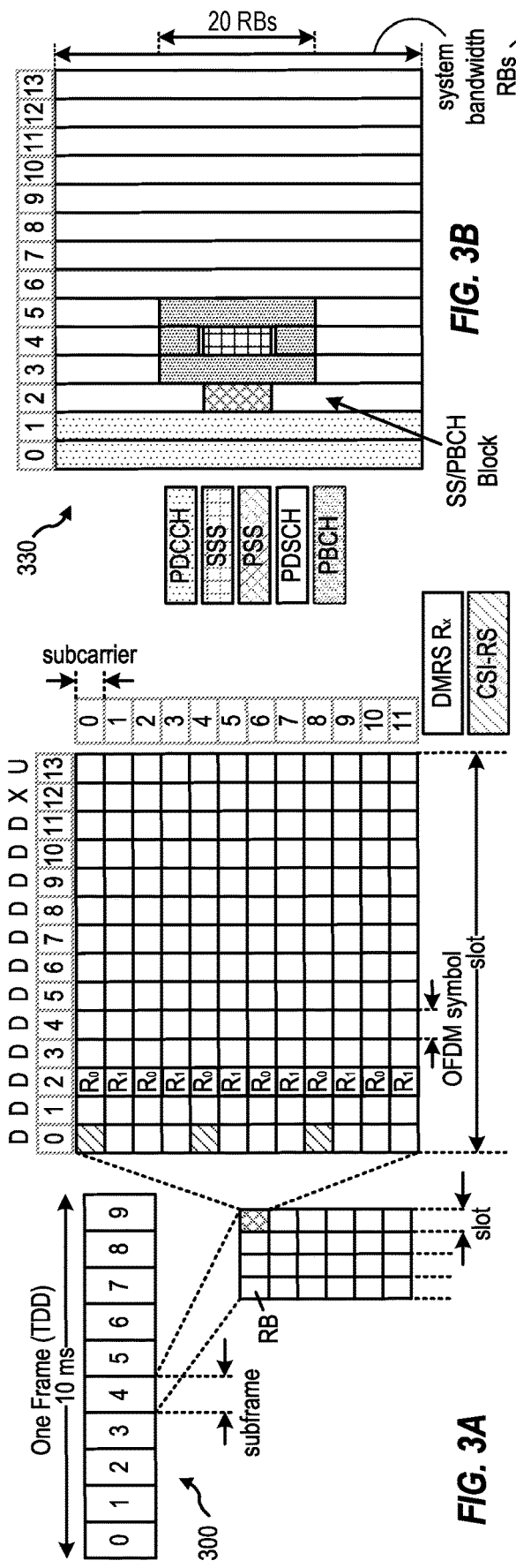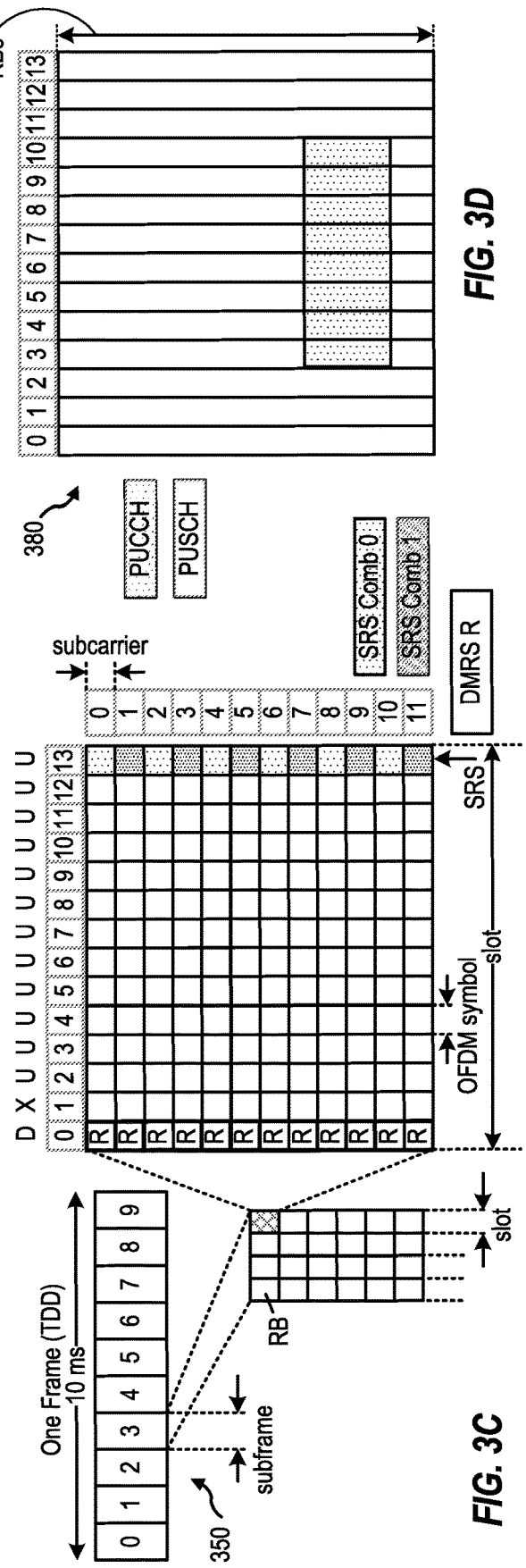
FIG. 3A  FIG. 3B  FIG. 3C  FIG. 3D

AUTOMATIC GAIN CONTROL (AGC) SYMBOL INDICATION

INTRODUCTION

Aspects of the present disclosure relate to wireless communications, and more particularly, to techniques for full-duplex (FD) communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include spectral efficiencies in configuring resources for cross-link interference measurements.

Certain aspects of the subject matter described in this disclosure can be implemented in a method for wireless communication by a network entity. The method generally includes determining a trigger condition is satisfied for requesting an uplink signal from a user equipment (UE) for self-interference measurement. The method generally includes, in response to determining the trigger condition is satisfied, transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in a full duplex (FD) mode. The method generally includes measuring the uplink signal, from the UE, in the one or more first symbols. The method generally includes adjusting an automatic gain control (AGC) level at the network entity based on measurements in the first one or more symbol. The method generally includes using the adjusted AGC level during the one or more second symbols to receive the uplink transmission from the UE.

Certain aspects of the subject matter described in this disclosure can be implemented in a method for wireless communication by a UE. The method generally includes receiving, from a network entity, signaling to transmit an uplink transmission in one or more first symbols. The method generally includes receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode. The method generally includes transmitting the uplink signal in the one or more second symbols. The method generally includes transmitting the uplink transmission in the one or more first symbols.

Certain aspects of the subject matter described in this disclosure can be implemented in an apparatus for wireless communication. The apparatus generally includes a memory and a processor coupled to the memory. The processor and the memory are configured to determine a trigger condition is satisfied for requesting an uplink signal from a UE for self-interference measurement, in response to determining the trigger condition is satisfied, transmit, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in an FD mode, measure the uplink signal, from the UE, in the one or more first symbols, adjust an AGC level at the network entity based on measurements in the first one or more symbol, and use the adjusted AGC level during the one or more second symbols to receive the uplink transmission from the UE.

Certain aspects of the subject matter described in this disclosure can be implemented in an apparatus for wireless communication. The apparatus generally includes a memory and a processor coupled to the memory. The processor and the memory being configured to receive, from a network entity, signaling to transmit an uplink transmission in one or more first symbols, receive, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode, transmit the uplink signal in the one or more second symbols, and transmit the uplink transmission in the one or more first symbols.

Certain aspects of the subject matter described in this disclosure can be implemented in an apparatus for wireless communication. The apparatus generally includes means for determining a trigger condition is satisfied for requesting an uplink signal from a UE for self-interference measurement, in response to determining the trigger condition is satisfied, means for transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in an FD mode, means for measuring the uplink signal, from the UE, in the one or more first symbols, adjust an AGC level at the network entity based on measurements in the first one or more symbol, and means for using the adjusted AGC level during the one or more second symbols to receive the uplink transmission from the UE.

Certain aspects of the subject matter described in this disclosure can be implemented in an apparatus for wireless communication. The apparatus generally includes means for receiving, from a network entity, signaling to transmit an uplink transmission in one or more first symbols, means for receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode, means for transmitting the uplink signal in the one or more second symbols, and means for transmitting the uplink transmission in the one or more first symbols.

Certain aspects of the subject matter described in this disclosure can be implemented in a computer-readable medium. The computer-readable medium has instructions stored thereon for determining a trigger condition is satisfied for requesting an uplink signal from a UE for self-interference measurement, in response to determining the trigger condition is satisfied, transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in an FD mode, measuring the uplink signal, from the UE, in the one or more first symbols, adjusting an AGC level at the network entity based on measurements in the first one or more symbol, and using the adjusted AGC level during the one or more second symbols to receive the uplink transmission from the UE.

Certain aspects of the subject matter described in this disclosure can be implemented in a computer-readable medium. The computer-readable medium has instructions stored thereon for receiving, from a network entity, signaling to transmit an uplink transmission in one or more first symbols, receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode, transmitting the uplink signal in the one or more second symbols, and transmitting the uplink transmission in the one or more first symbols To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein.

FIGS. 3A-3D depict various example aspects of data structures for a wireless communication network, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques and apparatuses for mitigating self-interference (SI) at a wireless node engaging in full duplex (FD) communication. SI generally refers to an uplink (UL) or downlink (DL) signal that leaks from the wireless node's transmitter to its receiver thereby causing decoding issues with a desired DL or UL signal. In some cases, such leakage in FD communications may be avoided, or at least mitigated, by estimating SI and using the estimated SI to determine a desirable gain amount to be applied to an incoming signal for SI cancellation. For example, a received signal strength indictor (RSSI) measurement (e.g., measurement of the power present in a received radio signal) may be used to adjust the automatic gain control (AGC) of an incoming signal to suppress SI at the wireless node participating in the FD communication. Thus, accurate estimation of the power level of SI (e.g., accurate RSSI measurements) is critical to performing SI cancellation. However, the power level of SI, and more specifically, a current RSSI for an inbound transmission may continuously change. Further, in some cases a wireless node may go a long period without an FD symbol, scheduled with both UL and DL, in which RSSI measurement can be performed for estimating the SI. Thus, the SI may have changed significantly since the last measurement.

Accordingly, certain aspects described herein provide techniques and apparatuses for scheduling an additional AGC symbol introduced prior to one or more symbols scheduled for transmission in order to adjust AGC levels prior to the reception of a UL transmission or transmission of a DL transmission during FD communication by a wireless node. In particular, a network entity may indicate the additional AGC symbol to a user equipment (UE) scheduling the UE to send a UL signal in the additional AGC symbol so the network entity can receive the UL signal from the UE, measure the UL signal, estimate SI, and adjust an AGC level at the wireless node based on the measurement, prior to receiving a UL transmission while in an FD mode. Similarly, a UE may use an additional AGC symbol to receive a DL signal from a network entity, measure the DL signal, estimate SI, and adjust an AGC level at the UE based on the measurement, prior to receiving a DL transmission while in an FD mode. Adjusting the AGC level to receive an incoming transmission in FD communication may help to suppress SI at the UE or the network entity receiving the incoming transmission.

Introduction to Wireless Communication Networks

Figure 1:
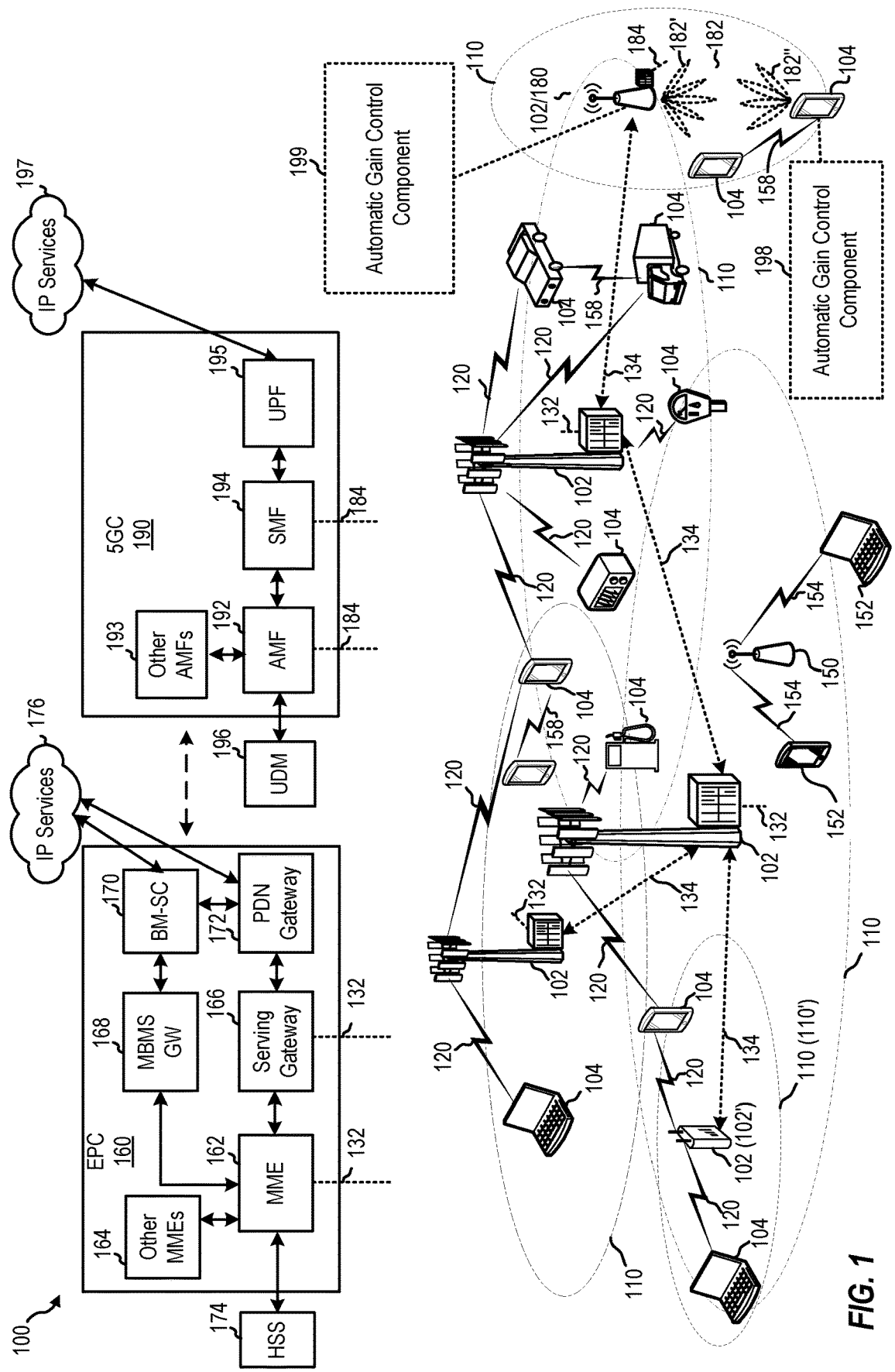
FIG. 1 is a block diagram conceptually illustrating an example wireless communication network, in accordance with certain aspects of the present disclosure.

FIG. 1 depicts an example of a wireless communications system 100, in which aspects described herein may be implemented. Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point (AP) to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC network 190), an AP, a base transceiver station, a radio base station, a radio transceiver, or a transceiver function, or a transmission reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

Communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. Communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 (e.g., BS 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In certain aspects, BS 102 in wireless communication network 100 includes an automatic gain control (AGC) component 199, which may be configured to transmit an indication to UE 104 to transmit an uplink (UL) signal in one or more first symbols. AGC component 199 may be configured to measure the UL signal, adjust an AGC level based on the measurement, and use the adjusted AGC level to receive a UL transmission while in a full duplex (FD) mode, according to aspects of the present disclosure. Similarly, in certain aspects, UE 104 in wireless network 100 includes an automatic gain control component 198, which may be used to receive an indication to transmit a UL signal and transmit a UL signal in response to receiving the indication, according to aspects of the present disclosure.

Figure 2:
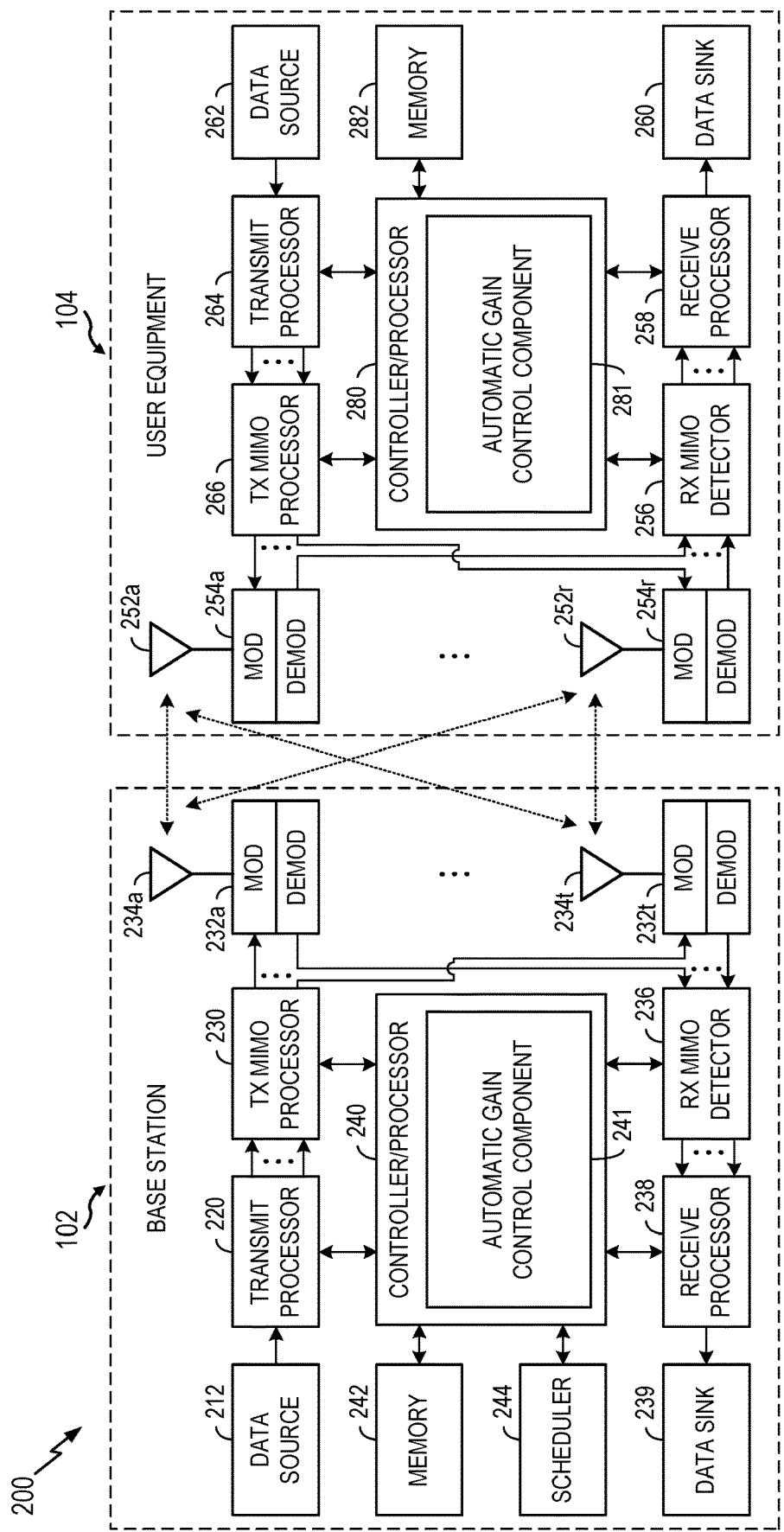
FIG. 2 is a block diagram conceptually illustrating aspects of an example of a base station (BS) and a user equipment (UE), in accordance with certain aspects of the present disclosure.

FIG. 2 depicts aspects of an example BS 102 and a UE 104, in accordance with certain aspects of the present disclosure. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and user equipment 104.

BS 102 includes controller/processor 240, which may be configured to implement various functions related to wireless communications. In the depicted example, controller/processor 240 includes an automatic gain control component 241, which may be representative of the automatic gain control component 199 of FIG. 1. Notably, while depicted as an aspect of controller/processor 240, the automatic gain control component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes an automatic gain control component 281, which may be representative of the automatic gain control component 198 of FIG. 1. Notably, while depicted as an aspect of controller/processor 280, the automatic gain control component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G New Radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Millimeter Wave (mmWave) Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3$^{rd}$ Generation Partnership Project (3GPP) standards. For example, 3GPP technical standard (TS) 38.101 currently defines Frequency Range 1 (FR1) as including 600 megahertz (MHz)-6 gigahertz (GHz), though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter (mm) and 10 mms.

Communications using mmWave/near mmWave radio frequency band (e.g., 3 GHz-300 GHz) may have higher path loss and a shorter range compared to lower frequency communications. As described above with respect to FIG. 1, a BS 102 (e.g., BS 180) configured to communicate using mmWave/near mmWave radio frequency bands may utilize beamforming (e.g., 182) with a UE (e.g., UE 104) to improve path loss and range.

Further, mmWave bands may be employed in full-duplex (FD) communications.

Example Full-Duplex (FD) Communications

In certain cases, a wireless communication system (e.g., a 5G New Radio (NR) system) may support full-duplex (FD) communications (also referred to herein as FD modes of operation), where wireless communication devices may communicate with each other simultaneously (e.g., via concurrent uplink (UL) and downlink (DL) transmissions). For instance, a UE (e.g., UE 104 illustrated in FIGS. 1 and 2) may include two separate antenna panels for simultaneous transmission and reception operations, where one antenna panel may be used for UL transmissions (e.g., of a physical uplink shared channel (PUSCH)) and another antenna panel may be for DL reception (e.g., physical downlink shared channel (PDSCH)). Further, a BS (e.g., BS 102 illustrated in FIGS. 1 and 2) may also includes two separate antenna panels for simultaneous transmission and reception operations, where one antenna panel may be used for DL transmissions (e.g., PDSCH) and another antenna panel may be for UL reception (e.g., PUSCH). As used herein, FD communication generally refers to any communication type where UL and DL transmissions at a UE or BS overlap (e.g., either partially or completely) in the time domain.

FD communications may facilitate desirable latency at a user equipment (UE), spectral efficiencies (e.g., per cell or per UE), and/or provide for a more efficient resource utilization. FD communications may use beam separation (e.g., separate beams for UL and DL transmissions). FD communications may be employed for Frequency Range 1 (FR1) and/or Frequency Range 2 (FR2) bands, integrated access and backhaul (IAB), and/or an access link. FD communications may be supported at the BS and/or UE.

FD communications may introduce interference (e.g., self-interference (SI) which is the leakage of a transmit signal to a device's own receiver) at certain wireless communication devices, and the interference may degrade the performance of wireless communications. A BS may encounter SI from FD communications, where a DL transmission transmitted by the BS interferes with a UL transmission received at the BS. A UE may encounter SI from FD communications, where a UL transmission transmitted by the UE interferes with a DL transmission received at the UE. FD communications may also generate interference from clutter echo. The interference may cause a decoding failure at a wireless communication device, and the wireless communication device may request a retransmission, which may increase the latency and decrease the throughput of wireless communications.

Figures 4A, 4B, 4C:
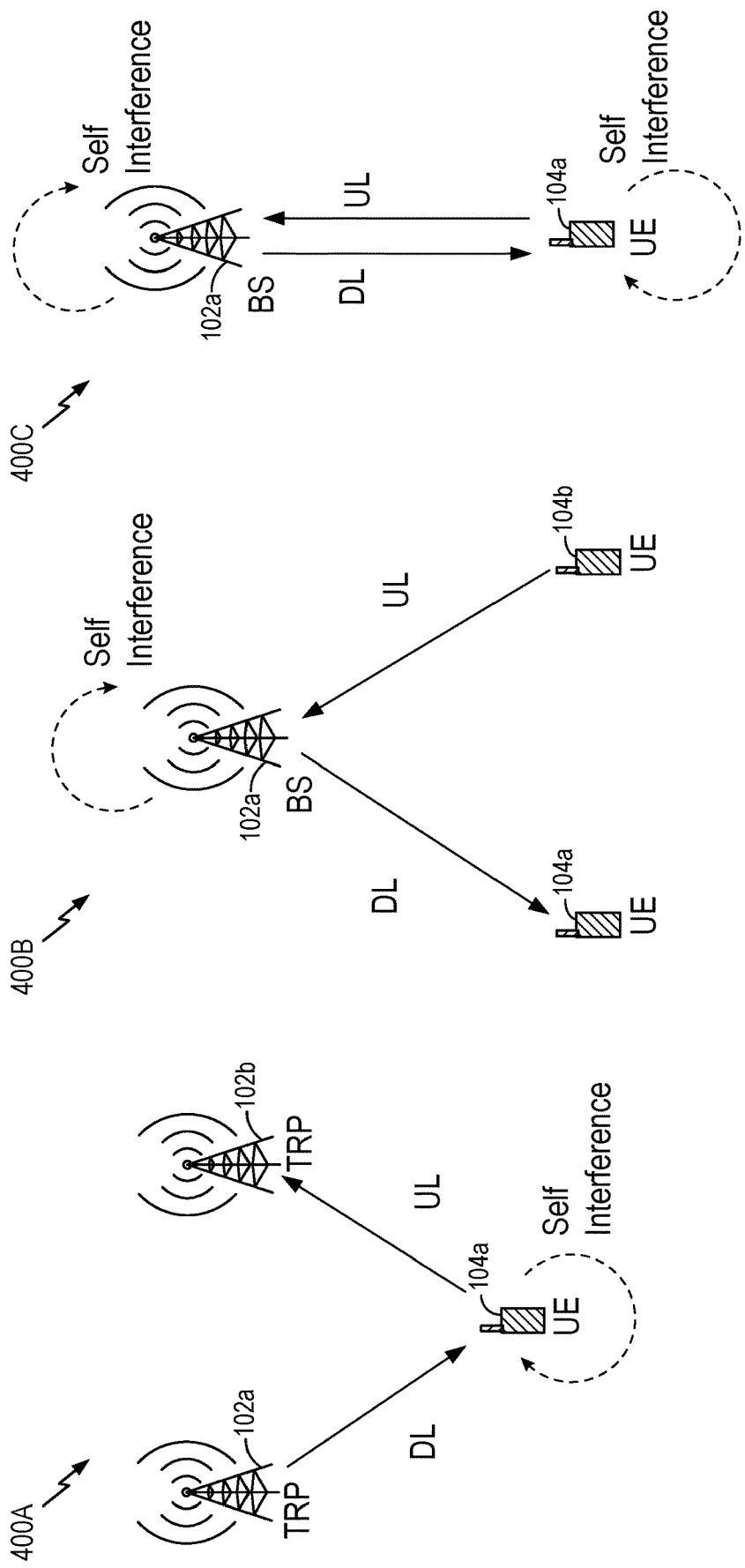
FIGS. 4A-4C are diagrams of example full-duplex (FD) communication deployments, in accordance with certain aspects of the present disclosure.

FIGS. 4A-4C are diagrams of example FD communication deployments, in accordance with certain aspects of the present disclosure.

FIG. 4A illustrates a deployment 400A including an FD UE 104a with multi-transmission/reception point (TRP)

communication. As illustrated in FIG. 4A, UE 104*a* may receive a DL transmission from BS 102*a* and transmit a UL transmission to UE 102*b*. The DL transmission and the UL transmission may overlap in the time-domain. Thus, UE 104*a* may be operating in an FD mode. UE 104*a* may experience SI from the UL transmission to the reception by UE 104*a* of the DL transmission. In other words, the UL transmission may cause interference and prevent proper reception and decoding of the DL transmission by UE 104*a*.

FIG. 4B illustrates a deployment 400B including an FD BS 102*a* and two UEs 104*a* and 104*b* (e.g., UEs 104 where FD communication is disabled). As illustrated in FIG. 4B, in some cases, a UE 104*a* may receive a DL transmission from a BS 102*a* (e.g., an FD BS), while another UE 104*b* may transmit a UL transmission to the same BS 102*a*. The UL transmission and the DL transmission may overlap in the time domain. BS 102*a*, operating in an FD mode, may thus experience SI from the DL transmission to the reception by BS 102*a* of the UL transmission.

FIG. 4C illustrates a deployment 400C including an FD BS 102*a* and an FD UE 104*a*. As illustrated, UE 104*a* may receive a DL transmission from BS 102*a* and transmit a UL transmission to the same BS 102*a*. Thus, both UE 104*a* and BS 102*a* are operating in a FD mode. UE 104*a* may experience SI from the UL transmission to the reception by UE 104*a* of the DL transmission. In other words, the UL transmission may cause interference and prevent proper reception and decoding of the DL transmission. Further, BS 102*a* may experience SI from the DL transmission to the reception by BS 102*a* of the UL transmission.

Figure 5:
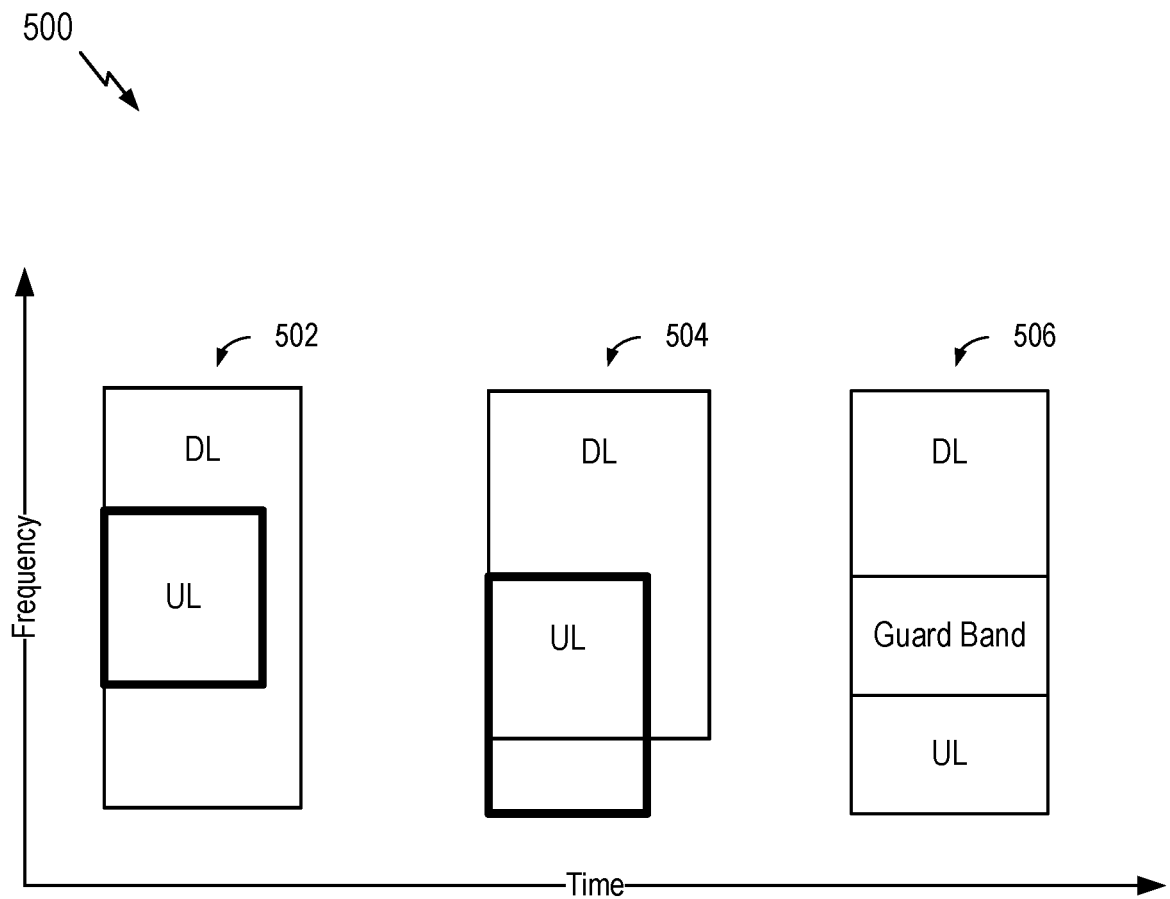
FIG. 5 illustrates examples of arrangements of frequency and time domain resources for FD communications, in accordance with certain aspects of the present disclosure.

FIG. 5 illustrates examples of arrangements of frequency and time domain resources 500 for FD communications, in accordance with certain aspects of the present disclosure. In certain cases, UL and DL FD traffic may be arranged in overlapping time and frequency resources. The term in-band full duplex may be used to refer to full duplex with overlapping time and frequency resources. A first arrangement 502 is shown with UL resources fully overlapping with DL resources for full duplex communications, and a second arrangement 504 is shown with the DL and UL resources partially overlapping with each other.

In certain cases, UL and DL FD traffic may be arranged in separate sub-bands. The UL and DL FD traffic may be arranged in different frequency resources. The DL resource may be separated from the UL resource in the frequency domain. The term sub-band FD (e.g., also referred to as "flexible-duplex") may be used to refer to FD traffic with separate sub-bands for UL and DL resources. A third arrangement 506 is depicted with UL resources and DL resources arranged in separate sub-bands. In certain cases, a guard band (e.g., used to help prevent interference) may be arranged between the UL resources and the DL resources for FD communications. While the UL and DL transmissions are separated by a guard band, the UL and DL transmissions are scheduled within the same frequency band and are scheduled close together in the frequency domain. Therefore, the UL transmission may cause interference with the DL transmission, the severity of which being dependent on the adjacent channel leakage ratio (ACLR) associated with the UL transmission.

In certain cases, a slot may be defined as D+U slot where a band is used for both UL and DL transmission. The DL and UL transmissions can occur in overlapping bands (in-band full-duplex) or adjacent bands (sub-band full-duplex), for example, as depicted in FIG. 5. In a given 'D+U' symbol, a half-duplex (HD) UE may transmit in an UL band or receive in a DL band. HD communication provides a two-way directional communication but with communication in one direction at a time. In a given 'D+U' symbol, an FD UE may transmit in the UL band and/or receive in the DL band in the same slot. A 'D+U' slot may include DL only symbols, UL only symbols, or FD symbols.

While certain examples provided herein may be described with respect to an FD mode of operation to facilitate understanding, the aspects described herein are applicable to any scenario where UL and DL transmissions overlap in the time domain, such as in FD and flexible-duplex implementations, as described.

Figure 6:
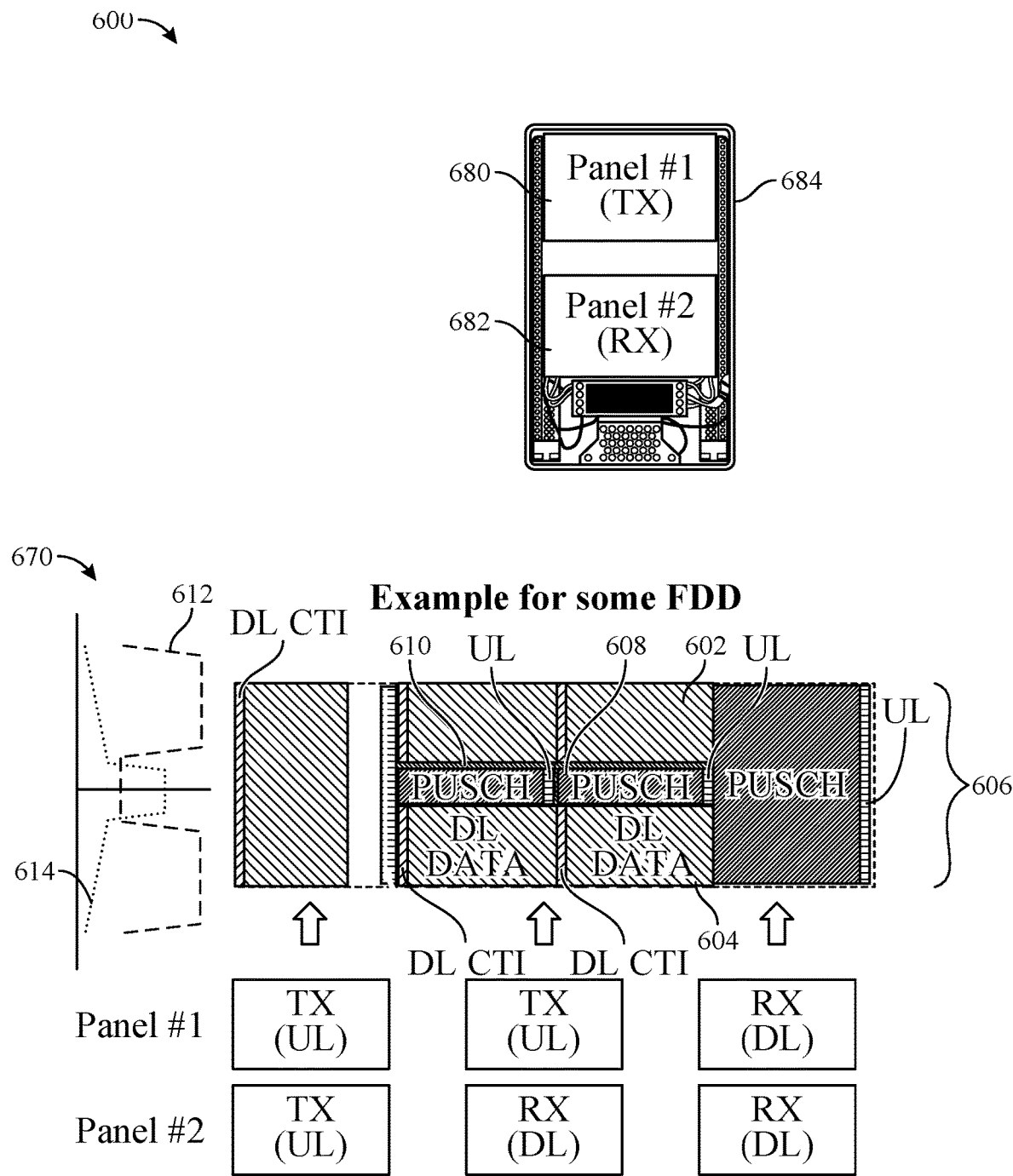
FIG. 6 depicts example slot formats for FD communications, in accordance with certain aspects of the present disclosure.

FIG. 6 is an example implementation 600 for flexible-duplex operation, in accordance with certain aspects of the present disclosure. As shown, a UE 684 (e.g., corresponding to UE 104*a* illustrated in FIGS. 4A and 4C) may include two separate antenna panels 680, 682 for simultaneous transmission and reception operations. For example, antenna panel 680 may be for UL transmissions (e.g., of a PUSCH) at both edges 602, 604 of a band 606, while antenna panel 682 may be for DL reception (e.g., DL data) at a center 608 of the band 606. As shown, the DL transmissions (e.g., DL reception from the perspective of UE 684) and UL transmissions may be in different portions of the band, with a guard band 610 between the UL and DL resources.

Diagram 670 illustrates a power spectral density (PSD) 612 for the DL transmission, and a PSD 614 for the UL transmission. As shown, the power from the UL transmission may leak into the frequency resources allocated for the DL transmission due to the ACLR associated with the UL transmission, causing self-interference (SI). In some implementations, different beams may be used for UL and DL transmissions. In this case, the power from a UL transmission on the UL beam may leak into a DL beam for the DL transmission, causing SI.

While the example provided in FIG. 6 is described with respect to a UE operating in an FD mode, the aspects described with respect to FIG. 6 may be similarly applicable to a network entity operating in an FD mode.

As mentioned, SI at a UE generally refers to a UL signal that leaks from the UE's transmitter to its receiver thereby causing decoding issues with a desired DL signal, while SI at a network entity generally refers to a DL signal that leaks from the network entity's transmitter to its receiver thereby causing decoding issues with a UL signal. In some cases, such leakage in FD communications may be avoided, or at least mitigated, by estimating SI and using the estimated SI to determine a desirable gain amount to be applied to an incoming signal for SI cancellation. For example, a UE or network entity may use a received signal strength indictor (RSSI) measurement (e.g., measurement of the power present in a received radio signal) to adjust the automatic gain control (AGC) of an incoming signal to suppress SI at the UE or the network entity participating in FD communication.

Accordingly, accurate estimation of the power level of SI (e.g., accurate RSSI measurements) is critical to performing SI cancellation. However, the power level of SI, and more specifically, a current RSSI for an inbound channel (e.g., UL channel at a network entity and DL channel at a UE) may continuously change. The RSSI may change in some cases, due to a local reflector being removed, added, or changed, a change in a beam pair used for communication between the network entity and the UE, non-linearities of one or more filters in a transmit (TX) chain or a receive (RX) chain at the network entity or UE engaging FD communication, or an instantaneous signals transmitted by the network entity or the UE.

Accordingly, what is needed are techniques and apparatus which enable a network entity or a UE to perform an RSSI measurement to accurately estimate SI for SI cancellation prior to reception of a transmission when operating in an FD mode.

Example Automatic Gain Control (AGC) Symbol Indication

Aspects of the present disclosure provide techniques and apparatuses for mitigating self-interference (SI) at a wireless node by adjusting automatic gain control (AGC) levels at the wireless node prior to reception of a transmission during full duplex (FD) communication. According to certain aspects described herein, to allow for adjusting AGC levels prior to the reception of an uplink (UL) transmission at a network entity or downlink (DL) transmission at user equipment (UE) during FD communication, an additional AGC symbol may be introduced prior to one or more symbols used to receive the UL or DL transmission. For example, when one or more trigger conditions are detected, indicating a fresh measurement for AGC adjustment is desired, the additional AGC symbol may be scheduled, rather than waiting for a next measurement opportunity. The network entity may use the AGC symbol to receive an UL signal, measure the UL signal, and adjust an AGC level at the network entity based on the measurement, prior to receiving an UL transmission from a UE while in an FD mode. Similarly, the UE may use the AGC symbol to receive a DL signal, measure the DL signal, and adjust an AGC level at the UE based on the measurement, prior to receiving a DL transmission while in an FD mode. As used herein, adjusting the AGC level for receiving a transmission may include adjusting the amplitude of a received UL/DL signal at an analog to digital converter (ADC) output in the network entity/UE's receive chain. As mentioned previously, adjusting the AGC level for receiving an incoming transmission may help to suppress SI at the UE or the network entity participating in the FD communication.

While certain examples provided herein may be described with respect to a network entity operating in an FD mode to facilitate understanding (e.g., such as a BS 102a operating in an FD mode in FIGS. 4B and 4C), the aspects described herein may be similarly applicable to any scenario where a UE is operating in an FD mode (e.g., UE 104a operating in an FD mode in FIGS. 4A and 4C).

Figure 7:
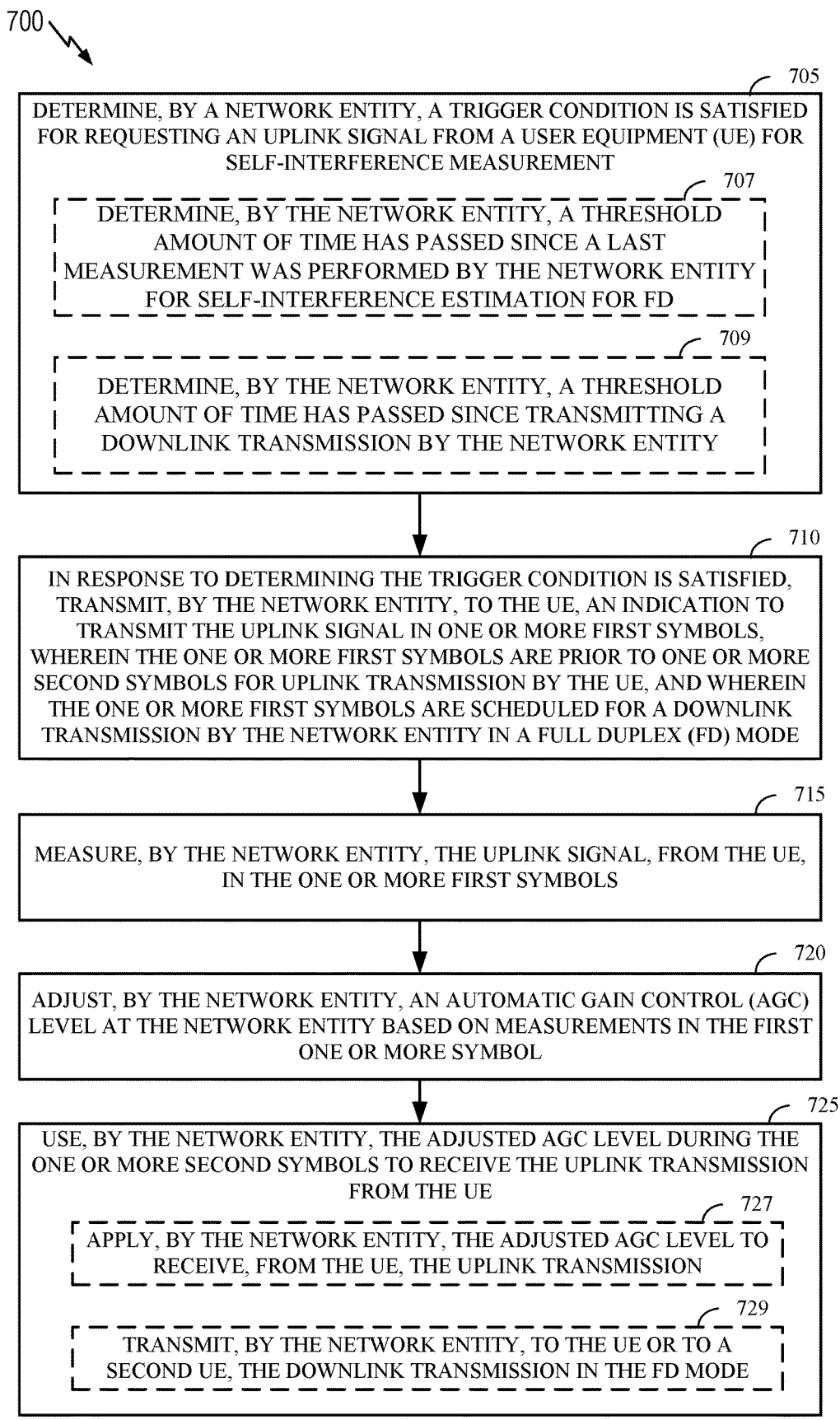
FIG. 7 is a flow diagram illustrating example operations for wireless communication by a network entity, in accordance with certain aspects of the present disclosure.

FIG. 7 is a flow diagram illustrating example operations 700 for wireless communication by a network entity, in accordance with certain aspects of the present disclosure. Operations 700 may be performed, for example, by a base station (BS), such as BS 102 in wireless communications system 100.

Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network (RAN), such as a BS, a remote radio head or antenna panel in communication with a BS, and/or a network controller, for example.

Operations 700 may begin, at block 705, by the network entity determining a trigger condition is satisfied for requesting an UL signal from a UE (e.g., UE 104b in FIG. 4B or UE 104a in FIG. 4C) for SI measurement. In certain aspects, determining the trigger condition is satisfied may include, at block 707, determining, by the network entity, a threshold amount of time has passed since a last measurement was performed by the network entity for self-interference estimation for FD. In certain other aspects, determining the trigger condition is satisfied may include, at block 709, determining, by the network entity, a threshold amount of time has passed since transmitting a downlink transmission by the network entity.

At block 710, the network entity, in response to determining the trigger condition is satisfied, transmits, to the UE, an indication to transmit the uplink signal in one or more first symbols, wherein the one or more first symbols are prior to one or more second symbols for uplink transmission by the UE. Further, the one or more first symbols may be scheduled for a downlink transmission by the network entity in an FD mode.

At block 715, the network entity measures the uplink signal, from the UE, in the one or more first symbols.

At block 720, the network entity adjusts an AGC level at the network entity based on measurements in the first one or more symbol.

At block 725, the network entity uses the adjusted AGC level during the one or more second symbols to receive the uplink transmission from the UE. In certain aspects, using the adjusted AGC level during the second one or more symbols includes, at block 727, applying, by the network entity, the adjusted AGC level to receive, from the UE, the uplink transmission and, at block 729, transmitting, to the UE or a second UE, the downlink transmission in the FD mode.

Figure 8:
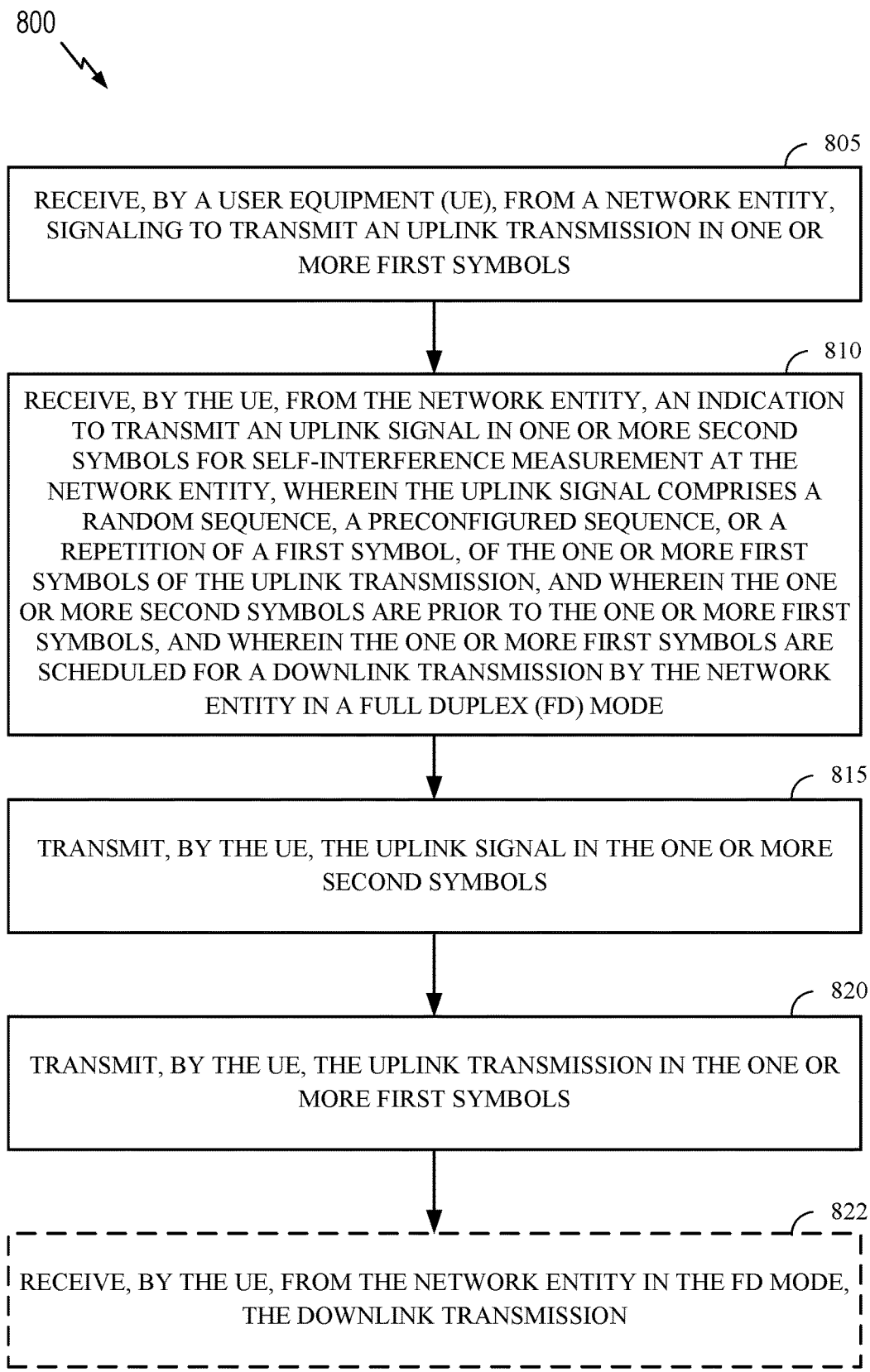
FIG. 8 is a flow diagram illustrating example operations for wireless communication by a user equipment (UE), in accordance with certain aspects of the present disclosure.

FIG. 8 is a flow diagram illustrating example operations 800 for wireless communication by a UE, in accordance with certain aspects of the present disclosure. Operations 800 may be performed, for example, by UE 104 in wireless communications system 100. Operations 800 may be complementary to the operations 700 performed by the network entity.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 may begin, at block 805, by the UE receiving, from a network entity (e.g., the first BS 102a in FIG. 4A or BS 102a in FIG. 4C), signaling to transmit a UL transmission in one or more first symbols At block 810, the UE receives, from the network entity, an indication to transmit a UL signal in one or more second symbols for SI measurement at the network entity, wherein the one or more second symbols are prior to the one or more first symbols, and wherein the one or more first symbols are scheduled for a DL transmission by the network entity in an FD mode. The UL signal may be a random sequence, a preconfigured sequence, or a repetition of a first symbol, of the one or more first symbols of the UL transmission. In some cases, the UE receives the indication when a threshold amount of time has passed since an FD transmission has occurred between the UE and the network entity. In some cases, the UE receives the indication when at least one of: a local reflector has been removed, added, or changed or a change in a beam pair used for communication between the network entity and the apparatus has occurred.

At block 815, the UE transmits the uplink signal in the one or more second symbols. At block 820, the UE transmits the uplink transmission in the one or more first symbols. Further, optionally at block 822, the UE receives, from the network entity in the FD mode, the downlink transmission.

Figure 9A:
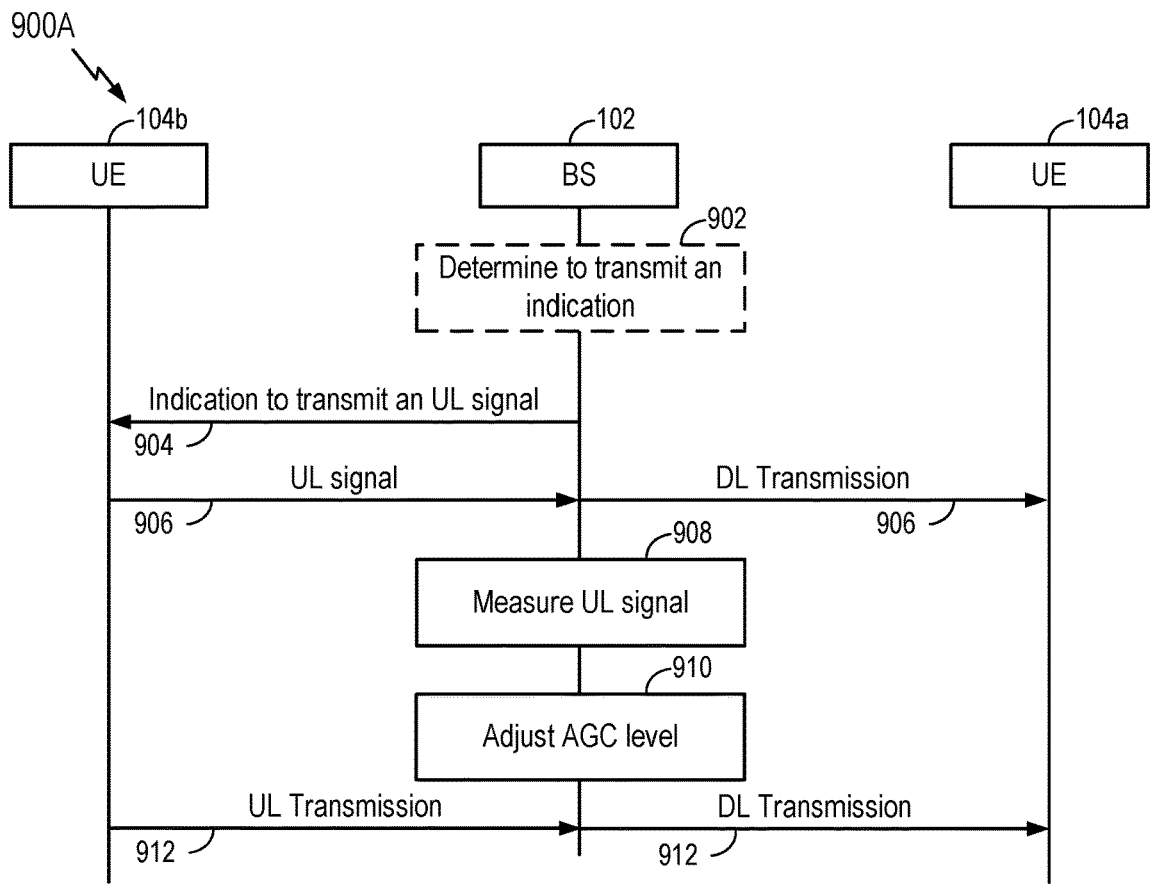
FIGS. 9A and 9B are call flow diagrams illustrating example signaling for adjusting an automatic gain control (AGC) level at a network entity based on uplink (UL) signal measurements, in accordance with certain aspects of the present disclosure.
Figure 9B:
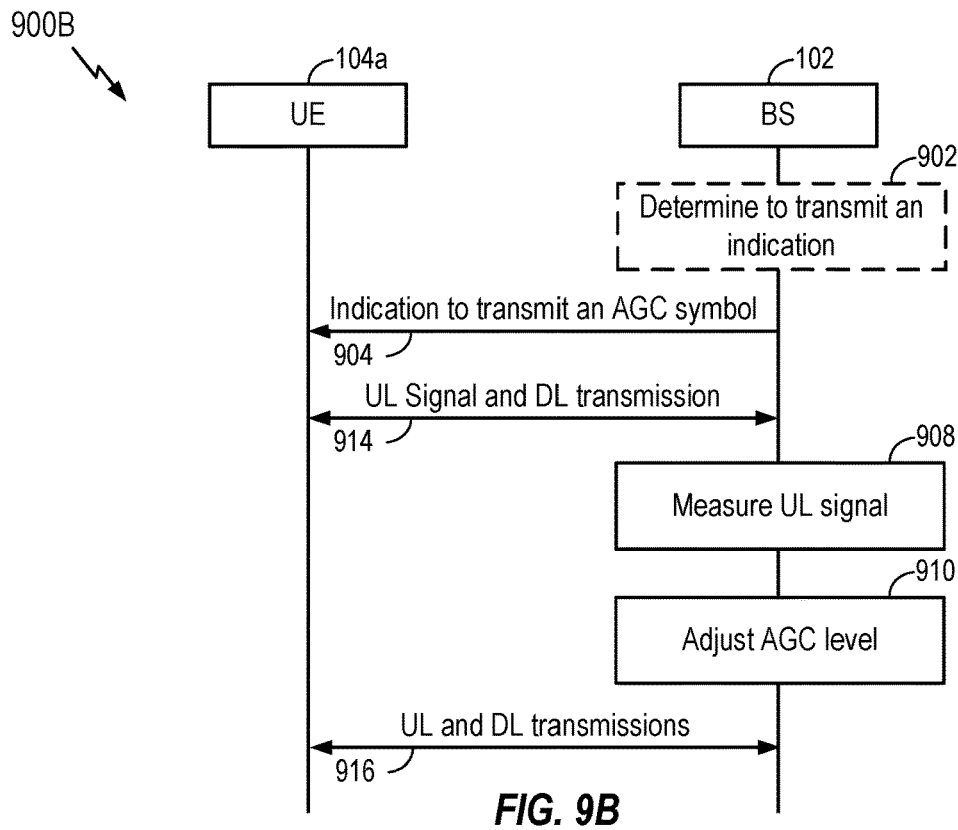

Operations 700 and 800 of FIG. 7 and FIG. 8, respectively, may be understood with respect to call flow diagrams 900A and 900B illustrated in FIGS. 9A and 9B, respectively. In particular, call flow diagrams 900A and 900B in FIGS. 9A and 9B, respectively, illustrate example signaling for adjusting an automatic gain control (AGC) level at a network entity based on UL signal measurements, in accordance with certain aspects of the present disclosure.

Call flow diagram 900A illustrates example signaling for adjusting an AGC level at a network entity for reception of a UL signal from one UE (e.g., UE 104b in FIG. 4B) and transmission of a DL transmission to another UE (e.g., UE 104a in FIG. 4B). Call flow diagram 900B illustrates example signaling for adjusting an AGC level at a network entity for reception of a UL signal from a UE (e.g., UE 104a in FIG. 4C) and transmission of a DL signal to the same UE.

As illustrated in FIG. 9A, at 902, a BS 102 (e.g., such as BS 102a illustrated in FIG. 4B) may determine to transmit, to UE 104a, an indication to transmit a UL signal in one or more first symbols (e.g., the UL signal from UE 104b at 906).

In some cases, BS 102 may determine the trigger condition is satisfied at 902 when BS 102 determines a current received signal strength indicator (RSSI) for a UL channel between UE 104b and BS 102 is unknown (or that the last known RSSI is "stale"). BS 102 may determine the current RSSI is unknown when detecting that a local reflector has been removed, added or changed, when a change in a beam pair used for communication between BS 102 and UE 104b has occurred, based on non-linearities of one or more filters in a transmit (TX) chain or a receive (RX) chain exist at BS 102, and/or when BS 102 has transmitted an instantaneous DL signal.

In some other cases, BS 102 may determine the trigger condition is satisfied at 902 when BS 102 determines a threshold amount of time has passed since a last measurement was performed by BS 102 for SI estimation for FD communications. In some other cases, BS 102 may determine the trigger condition is satisfied at 902 when BS 102 determines a threshold amount of time has passed since BS 102 has transmitted a DL transmission. The RSSI, and similarly SI, may vary significantly over time; thus, previous RSSI measurements may, in some cases, not provide accurate measurements for estimating SI at BS 102. Accordingly, measurements performed by BS 102 outside the threshold amount of time may not be accurate, and new measurements may be taken to accurately estimate SI for SI cancellation prior to receiving an UL transmission at BS 102 during FD communication.

At 904, BS 102 transmits the indication to UE 104b. The one or more first symbols may be symbols prior in time to one or more second symbols scheduled for reception of a UL transmission (e.g., the UL transmission at 912), from UE 104b, by BS 102 while operating in an FD mode. The one or more first symbols may also be symbols scheduled for a DL transmission, to UE 104a, by BS 102 (e.g., the DL transmission to UE 104a at 906) while operating in the FD mode. Accordingly, at 906, in the one or more first symbols, BS 102 receives the UL signal from UE 104b and transmits the DL transmission to UE 104a in the FD mode (e.g., simultaneously or overlapping in time). In certain aspects, the one or more first symbols may be one or more symbols immediately preceding the one or more second symbols, for example, as illustrated in FIG. 10.

Figure 10:
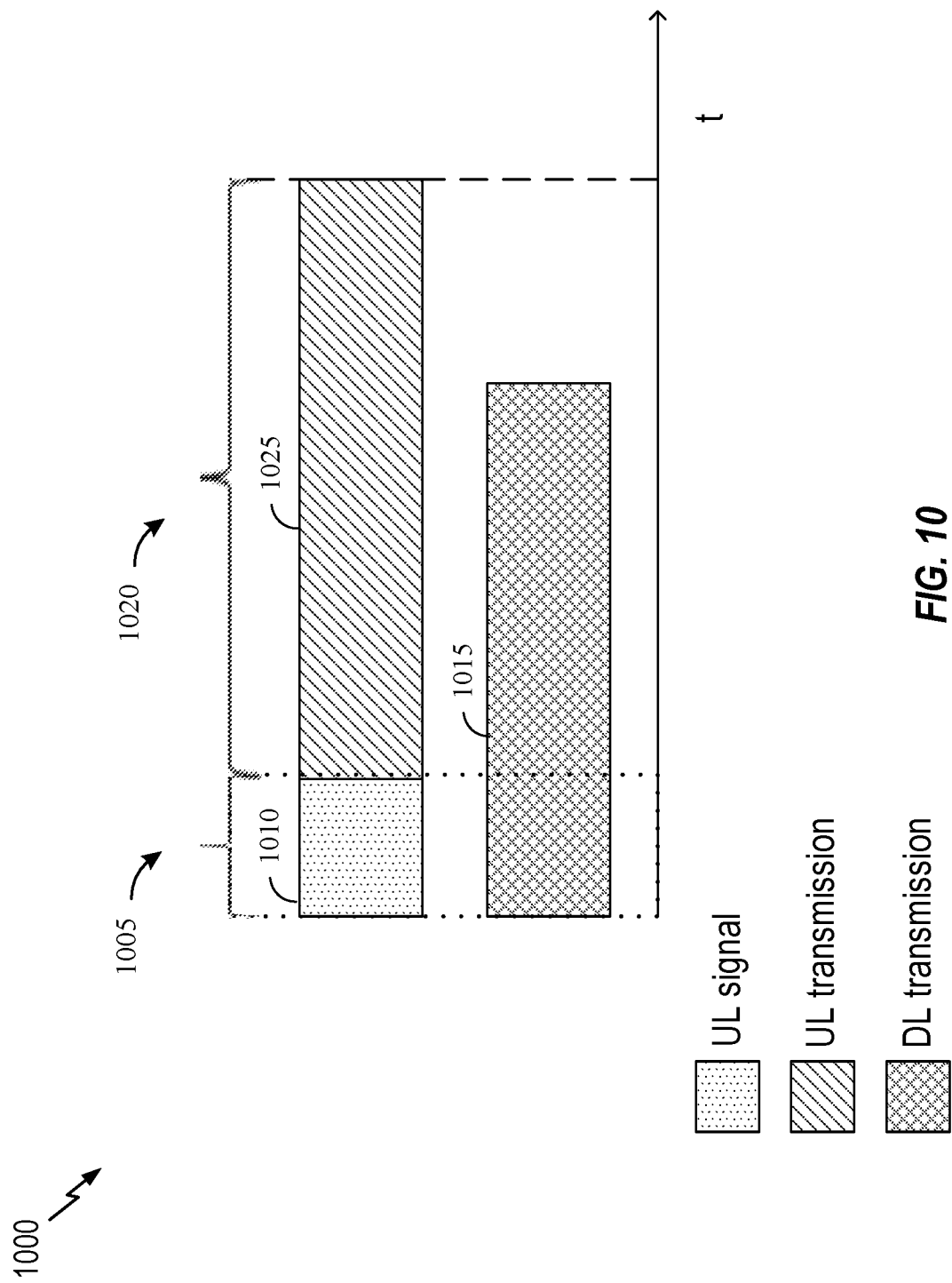
FIG. 10 illustrates a diagram of an example UL signal reception during FD communications, in accordance with certain aspects of the present disclosure.

FIG. 10 illustrates a diagram 1000 of an example UL signal reception during FD communications, in accordance with certain aspects of the present disclosure. As shown in FIG. 10, BS 102 operating in an FD mode may be scheduled to receive a UL signal 1010 in one or more first symbols 1005 (e.g., additional AGC symbol(s)) while simultaneously transmitting a DL transmission 1015 (e.g., a physical downlink shared channel (PDSCH)) in the one or more first symbols 1005. The one or more first symbols 1005 are prior in time to the one or more second symbols 1020. In the example illustrated in FIG. 10, the one or more first symbols 1005 immediately precede the one or more second symbols 1020 for the UL transmission 1025 (e.g., a physical uplink shared channel (PUSCH)) and the DL transmission 1015 (e.g., the remainder of the DL transmission in the one or more first symbols 1005 or a separate transmission). In certain aspects, a number of the one or more first symbols 1005 (e.g., a number of additional AGC symbols) used to transmit the UL signal 1010 is based, at least in part, on a subcarrier spacing (SCS) of at least one of: the UL transmission 1025 (e.g., PUSCH), the DL transmission 1015 (e.g., PDSCH), or both. In some cases, the SCS for the UL transmission 1025 and the DL transmission 1015 are the same. In some cases, the SCS for the UL transmission and the DL transmission are different.

Referring back to FIG. 9A, in certain aspects, BS 102 transmits the indication at 904 in downlink control information (DCI) (not shown) scheduling the UL transmission 912 by UE 104b. In certain aspects, BS 102 transmits the indication at 904 in a medium access control (MAC) control element (CE) (MAC-CE) activating the UL transmission 912 by UE 104b.

In response to receiving the indication to transmit a UL signal to BS 102, UE 104b may transmit the UL signal in the one or more first symbols at 906. Concurrently, at 906, BS 102 (e.g., operating in the FD mode) may transmit a DL transmission to UE 104b. As mentioned, the UL signal and the DL transmission may both be scheduled on the same one or more first symbols.

In certain aspects, the UL signal transmitted by UE 104b at 906 is a random sequence. In certain aspects, the UL signal transmitted by UE 104b at 906 is a preconfigured (or predefined) sequence. In certain aspects, the random sequence, the preconfigured sequence, or both are known at both UE 104b and BS 102.

In certain aspects, the UL signal transmitted by UE 104b is a repetition of a first symbol of the UL transmission scheduled to be transmitted by UE 104b in the one or more second symbols (e.g., symbols after the one or more first symbols for transmission of the UL signal) at 912.

At 908, BS 102 measures the UL signal transmitted by UE 104b at 906. In certain aspects, BS 102 measures the UL signal by performing an RSSI measurement of the UL signal in the one or more first symbols in the FD mode. BS 102 may estimate an SI level based on the RSSI measurement.

At 910, BS 102 adjusts an AGC level at BS 102 based on measurements in the first one or more symbol performed by BS 102 at 908. In certain aspects, adjusting the AGC level at 910 includes adjusting the AGC level to mitigate the estimated SI at BS 102 for FD communications in the second one or more symbols (e.g., for receipt of the UL transmission from UE 104b and transmission of the DL transmission to UE 104a in the second one or more symbols) at 912.

At 912, BS 102 uses the adjusted AGC level (e.g., at 910) during the one or more second symbols to receive the UL transmission from UE 104b. In certain aspects, using the adjusted AGC level during the second one or more symbols includes engaging in FD communication by simultaneously, at 912, in the second one or more symbols: applying the adjusted AGC level to receive, from UE 104b, the UL transmission and transmitting, to UE 104a, the DL transmission in the FD mode.

According to certain aspects, instead of receiving the UL signal and the UL transmission from UE 104b and transmitting the DL transmission to UE 104a as illustrated by the example signaling in FIG. 9A, in certain aspects, the UL signal and the UL transmission are received at BS 102 from the same UE 104a that the DL transmission is transmitted to. This scenario is illustrated by the example signaling in FIG. 9B.

As shown in FIG. 9B, similar to FIG. 9A, optionally at 902, a BS 102 may determine at trigger condition for requesting a UL signal from UE 104a for SI measurement has been satisfied. At 904, in some cases, in response to determining the trigger condition is satisfied, BS 102 (e.g., such as BS 102a illustrated in FIG. 4C) may transmit, to UE 104b, an indication to transmit a UL signal in one or more first symbols.

At 914, similar to 906 illustrated in FIG. 9A, BS 102 receives the UL signal in the one or more first symbols. However, unlike FIG. 9A, the DL transmitted at 914 is transmitted in one or more first symbols to UE 104b, instead of another UE, e.g., UE 104a as shown in FIG. 9A.

At 908, BS 102 measures the UL signal transmitted by UE 104b at 914. AT 910, BS 102 adjusts an AGC level at BS 102 based on measurements in the first one or more symbol performed by BS 102 at 908.

At 916, BS 102 uses the adjusted AGC level (e.g., adjusted at 910) during the one or more second symbols to receive the UL transmission from UE 104b. As shown in FIG. 9B, in certain aspects, using the adjusted AGC level during the second one or more symbols includes engaging in FD communication by simultaneously, at 916, in the second one or more symbols: applying the adjusted AGC level to receive, from UE 104b, the UL transmission and transmitting, to UE 104b (e.g., the same UE for which the UL transmission was received from), the DL transmission in the FD mode.

As mentioned previously, aspects described herein may be similarly applicable to scenarios where a UE is operating in an FD mode (e.g., as shown by UE 104a in FIGS. 4A and 4C).

In some cases, the UE operating in the FD mode may transmit, to a network entity, an indication for an additional AGC symbol in which the UE transmits a UL signal and receives a DL signal, and measures the DL signal. The UE may estimate SI at the UE based on the measurements of the DL signal, adjust an AGC level at the UE based on the measurement, and use the adjusted AGC level to receive a DL transmission from the network entity.

Example Wireless Communication Devices

Figure 11:
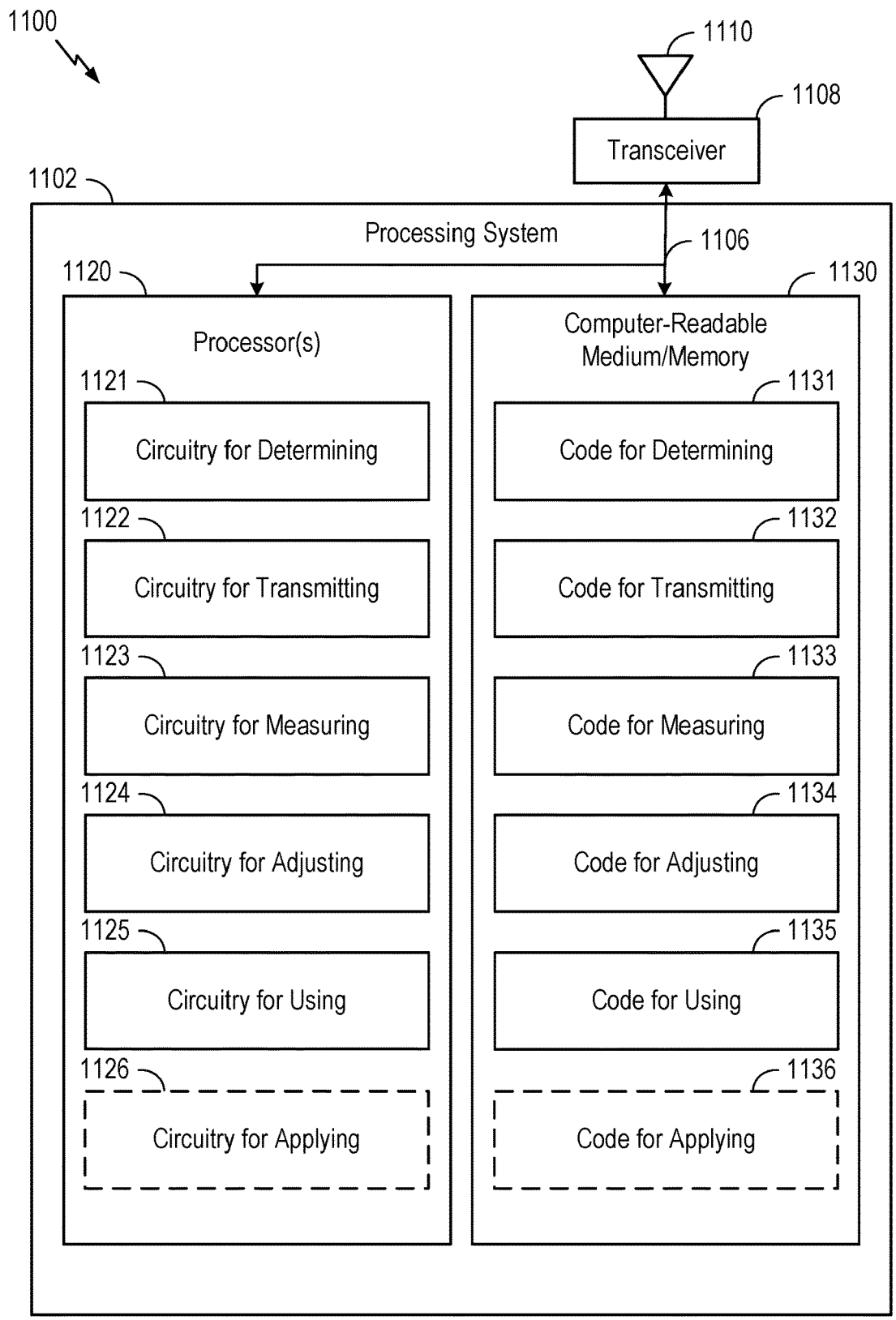
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) operable, configured, or adapted to perform operations for the techniques disclosed herein, such as the operations illustrated in FIG. 7. In some examples, communications device 1100 may be a network entity, such as a base station (BS) (e.g., BS 102 described with respect to FIGS. 1 and 2).

Communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Processing system 1102 may be configured to perform processing functions for the communications device 1100, including processing signals received and/or to be transmitted by the communications device 1100.

Processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by processor 1104, cause processor 1104 to perform the operations illustrated in FIG. 7, or other operations for performing the various techniques discussed herein for full-duplex (FD) communication.

In certain aspects, computer-readable medium/memory 1112 stores code 1131 (an example means for) for determining; code 1132 (an example means for) for transmitting; code 1133 (an example means for) for measuring; code 1134 (an example means for) for adjusting; code 1135 (an example means for) for using; and optionally code 1136 (an example means for) for applying.

In certain aspects, code 1131 for determining may include code for determining a trigger condition is satisfied for requesting an uplink signal from a user equipment (UE) for self-interference (SI) measurement. In certain aspects, code 1131 for determining may include code for determining a threshold amount of time has passed since a last measurement was performed by the network entity for self-interference estimation for FD communications. In certain aspects, code 1131 for determining may include code for determining a threshold amount of time has passed since transmitting a downlink transmission by the network entity.

In certain aspects, code 1132 for transmitting may include code for in response to determining the trigger condition is satisfied, transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in a FD mode. In certain aspects, code 1132 for transmitting may include code for transmitting, to a second UE, the downlink transmission in the FD mode. In certain aspects, code 1132 for transmitting may include code for transmitting, to the UE, the downlink transmission in the FD mode.

In certain aspects, code 1133 for measuring may include code for measuring the uplink signal, from the UE, in the one or more first symbols.

In certain aspects, code 1134 for adjusting may include code for adjusting an AGC level at the network entity based on measurements in the first one or more symbol.

In certain aspects, code 1135 for using may include code for using the adjusted AGC level during the one or more second symbols to receive the uplink transmission from the UE.

In certain aspects, optional code 1136 for applying may include code for applying the adjusted AGC level to receive, from the UE, the uplink transmission.

In certain aspects, processor 1104 has circuitry configured to implement the code stored in the computer-readable medium/memory 1112. Processor 1104 includes circuitry 1121 (an example means for) for determining; circuitry 1122 (an example means for) for transmitting; circuitry 1123 (an example means for) for measuring; circuitry 1124 (an example means for) for adjusting; circuitry 1125 (an example means for) for using; and optionally circuitry 1126 (an example means for) for applying.

In certain aspects, circuitry 1121 for determining may include circuitry for determining a trigger condition is satisfied for requesting an uplink signal from a UE for SI measurement. In certain aspects, circuitry 1121 for determining may include circuitry for determining a threshold amount of time has passed since a last measurement was performed by the network entity for self-interference estimation for FD communications. In certain aspects, circuitry 1121 for determining may include circuitry for determining a threshold amount of time has passed since transmitting a downlink transmission by the network entity.

In certain aspects, circuitry 1122 for transmitting may include circuitry for in response to determining the trigger condition is satisfied, transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in an FD mode. In certain aspects, circuitry 1122 for transmitting may include circuitry for transmitting, to a second UE, the downlink transmission in the FD mode. In certain aspects, circuitry 1122 for transmitting may include circuitry for transmitting, to the UE, the downlink transmission in the FD mode In certain aspects, circuitry 1123 for measuring may include circuitry for measuring the uplink signal, from the UE, in the one or more first symbols.

In certain aspects, circuitry 1124 for adjusting may include circuitry for adjusting an AGC level at the network entity based on measurements in the first one or more symbol.

In certain aspects, circuitry 1125 for using may include circuitry for using the adjusted AGC level during the one or more second symbols to receive the uplink transmission from the UE.

In certain aspects, optional circuitry 1126 for applying may include circuitry for applying the adjusted AGC level to receive, from the UE, the uplink transmission.

In some cases, the operations illustrated in FIG. 7, as well as other operations described herein, may be implemented by one or more means-plus-function components. For example, in some cases, such operations may be implemented by means transmitting and means for communicating.

Means for communicating may include means for receiving and means for transmitting. Means for receiving or means for obtaining may include a receiver (such as receive processor 238) or antenna(s) 234 of BS 102 illustrated in FIG. 2. Means for transmitting or means for outputting may include a transmitter (such as transmit processor 220) or antenna(s) 234 of BS 102 illustrated in FIG. 2.

Transceiver 1108 may provide a means for receiving or transmitting information. Information may be passed on to other components of communications device 1100. Antenna 1110 may correspond to a single antenna or a set of antennas. Transceiver 1308 may provide means for transmitting signals generated by other components of communications device 1100.

Notably, FIG. 11 is just one example, and many other examples and configurations of communications device 1100 are possible.

Figure 12:
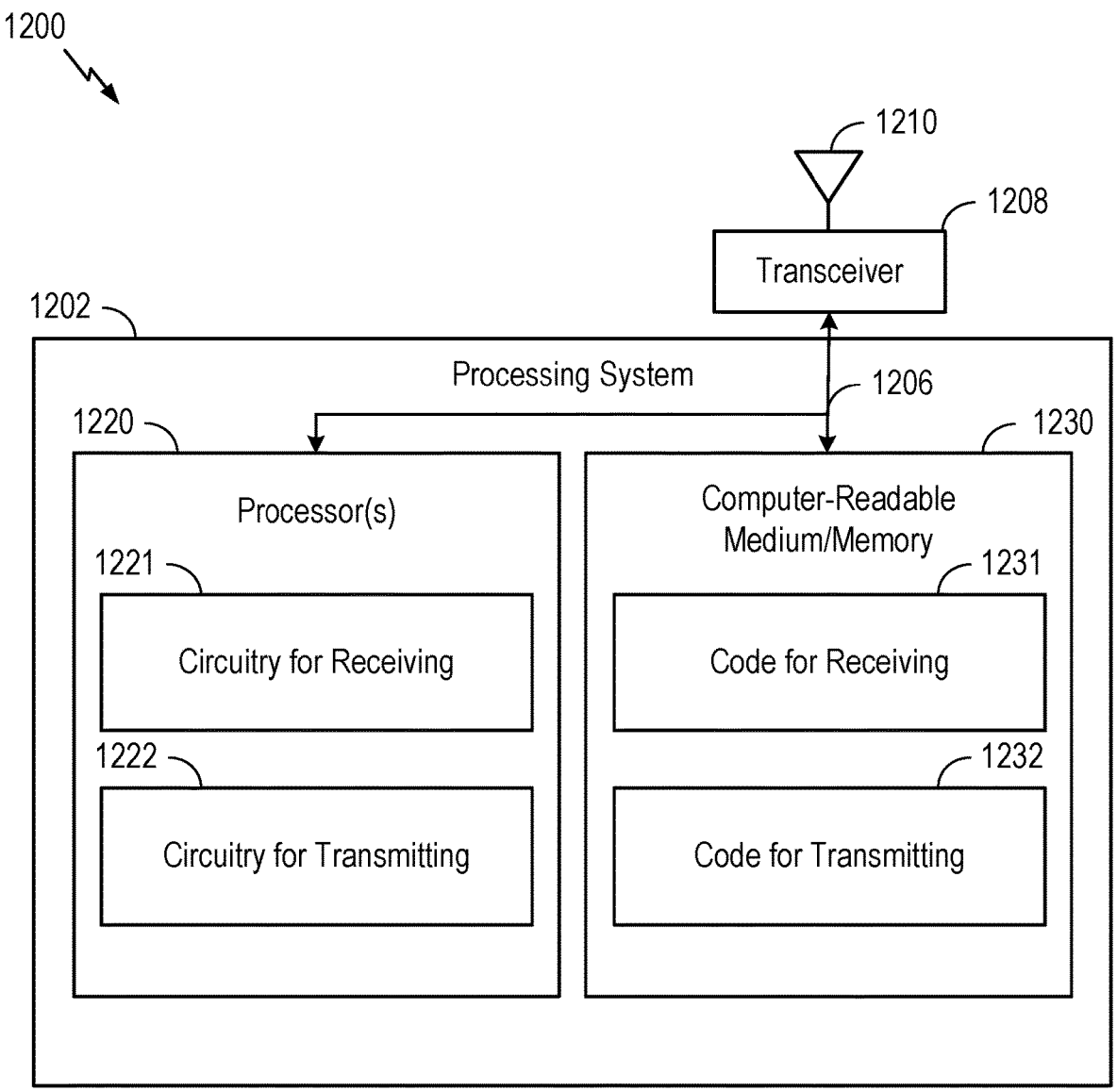
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) operable, configured, or adapted to perform operations for the techniques disclosed herein, such as the operations illustrated in FIG. 8. In some examples, communications device 1200 may be a user equipment (UE), such as UE 104 described with respect to FIGS. 1 and 2.

Communications device 1200 includes a processing system 1202 coupled to a transceiver 1208 (e.g., a transmitter and/or a receiver). Transceiver 1208 is configured to transmit and receive signals for communications device 1200 via an antenna 1210, such as the various signals as described herein. Processing system 1202 may be configured to perform processing functions for the communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 8, or other operations for performing the various techniques discussed herein for FD communication.

In certain aspects, computer-readable medium/memory 1212 stores code 1231 (an example means for) for receiving and code 1232 (an example means for) for transmitting.

In certain aspects, code 1231 for receiving may include code for receiving, from a network entity, signaling to transmit an uplink transmission in one or more first symbols. In certain aspects, code 1231 for receiving may include code for receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode. In certain aspects, code 1231 for receiving may include code for receiving, from the network entity in the FD mode, the downlink transmission.

In certain aspects, code 1232 for transmitting may include code for transmitting the uplink signal in the one or more second symbols. In certain aspects, code 1232 for transmitting may include code for transmitting the uplink transmission in the one or more first symbols.

In certain aspects, processor 1204 has circuitry configured to implement the code stored in computer-readable medium/memory 1212. Processor 1204 includes circuitry 1221 (an example means for) for receiving and circuitry 1222 (an example means for) for transmitting.

In certain aspects, circuitry 1221 for receiving may include circuitry for receiving, from a network entity, signaling to transmit an uplink transmission in one or more first symbols. In certain aspects, circuitry 1221 for receiving may include circuitry for receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in an FD mode. In certain aspects, circuitry 1221 for receiving may include circuitry for receiving, from the network entity in the FD mode, the downlink transmission.

In certain aspects, circuitry 1222 for transmitting may include circuitry for transmitting the uplink signal in the one or more second symbols. In certain aspects, circuitry 1222 for transmitting may include circuitry for transmitting the uplink transmission in the one or more first symbols.

In some cases, the operations illustrated in FIG. 8, as well as other operations described herein, may be implemented by one or more means-plus-function components. For example, in some cases, such operations may be implemented by means for receiving, and means for communicating.

Means for communicating may include means for receiving and means for transmitting. Means for receiving or means for obtaining may include a receiver (such as receive processor 258) or antenna(s) 252 of UE 104 illustrated in FIG. 2. Means for transmitting or means for outputting may include a transmitter (such as transmit processor 264) or antenna(s) 252 of UE 104 illustrated in FIG. 2.

Transceiver 1208 may provide a means for receiving or transmitting information. Information may be passed on to other components of communications device 1200. Antenna 1210 may correspond to a single antenna or a set of antennas. Transceiver 1208 may provide means for transmitting signals generated by other components of communications device 1200.

Notably, FIG. 12 is just one example, and many other examples and configurations of communications device 1200 are possible.

Automatic gain control component 198 and automatic gain control component 199 may support wireless communication in accordance with examples as disclosed herein.

Automatic gain control component 198 and automatic gain control component 199 may be an example of means for performing various aspects described herein. Automatic gain control component 198 and automatic gain control component 199, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, automatic gain control component 198 and automatic gain control component 199, or its sub-components, may be implemented in code (e.g., as configuration management software or firmware) executed by a processor, or any combination thereof. If implemented in code executed by a processor, the functions of automatic gain control component 198 and automatic gain control component 199, or its sub-components may be executed by a general-purpose processor, a DSP, an ASIC, a FPGA or other programmable logic device.

In some examples, automatic gain control component 198 and automatic gain control component 199 may be configured to perform various operations (e.g., receiving, determining, transmitting/sending) using or otherwise in cooperation with the transceiver 1108 or 1208.

Automatic gain control component 198 and automatic gain control component 199, or its sub-components, may be physically located at various positions, including being distributed such that portions of functions are implemented at different physical locations by one or more physical components. In some examples, automatic gain control component 198 and automatic gain control component 199, or its sub-components, may be a separate and distinct component in accordance with various aspects of the present disclosure. In some examples, automatic gain control component 198 and automatic gain control component 199, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Example Clauses

Implementation examples are described in the following numbered clauses:

Clause 1: A method for wireless communication by a network entity, comprising: determining a trigger condition is satisfied for requesting an uplink signal from a user equipment (UE) for self-interference measurement; in response to determining the trigger condition is satisfied, transmitting, to the UE, an indication to transmit the uplink signal in one or more first symbols, wherein the one or more first symbols are prior to one or more second symbols for uplink transmission by the UE, and wherein the one or more first symbols are scheduled for a downlink transmission by the network entity in a full duplex (FD) mode; measuring the uplink signal, from the UE, in the one or more first symbols; adjusting an AGC level at the network entity based on measurements in the first one or more symbol; and using the adjusted AGC level during the one or more second symbols to receive the uplink transmission from the UE.

Clause 2: The method of Clause 1, wherein determining the trigger condition is satisfied comprises: determining a current received signal strength indicator (RSSI) for an uplink channel between the UE and the network entity is unknown.

Clause 3: The method of Clause 2, wherein determining the current RSSI for the uplink channel is unknown comprises detecting at least one of: a local reflector has been removed, added, or changed; a change in a beam pair used for communication between the network entity and the UE; non-linearities of one or more filters in a transmit (TX) chain or a receive (RX) chain at the network entity; or an instantaneous downlink signal transmitted by the network entity.

Clause 4: The method of any of Clauses 1-3, wherein determining the trigger condition is satisfied comprises: determining a threshold amount of time has passed since a last measurement was performed by the network entity for self-interference estimation for FD communications.

Clause 5: The method of any of Clauses 1-4, wherein determining the trigger condition is satisfied comprises: determining a threshold amount of time has passed since transmitting a downlink transmission by the network entity.

Clause 6: The method of any of Clauses 1-5, wherein transmitting the indication to the UE comprises transmitting the indication to the UE in downlink control information (DCI) scheduling the uplink transmission.

Clause 7: The method of any of Clauses 1-6, wherein transmitting the indication to the UE comprises transmitting the indication to the UE in a medium access control (MAC) control element (CE) (MAC-CE) activating the uplink transmission.

Clause 8: The method of any of Clauses 1-7, wherein the uplink signal comprises a random sequence or a preconfigured sequence.

Clause 9: The method of any of Clauses 1-8, wherein the uplink signal comprises a repetition of a first symbol, of the one or more second symbols, of the uplink transmission.

Clause 10: The method of any of Clauses 1-9, wherein a number of the one or more first symbols used to transmit the uplink signal is based, at least in part, on a subcarrier spacing (SCS) of at least one of: the uplink transmission, the downlink transmission, or both.

Clause 11: The method of any of Clauses 1-10, wherein the one or more first symbols comprise one or more symbols immediately preceding the one or more second symbols.

Clause 12: The method of any of Clauses 1-11, wherein adjusting the AGC level at the network entity comprises adjusting the AGC level to mitigate self-interference at the network entity for full-duplex communications in the second one or more symbols.

Clause 13: The method of any of Clauses 1-12, wherein using the adjusted AGC level during the second one or more symbols comprises engaging in full duplex communication by simultaneously in the second one or more symbols: applying the adjusted AGC level to receive, from the UE, the uplink transmission; and transmitting, to a second UE, the downlink transmission in the FD mode.

Clause 14: The method of any of Clauses 1-13, wherein using the adjusted AGC level during the second one or more symbols comprises engaging in full duplex communication by simultaneously in the second one or more symbols: applying the adjusted AGC level to receive, from the UE, the uplink transmission; and transmitting, to the UE, the downlink transmission in the FD mode.

Clause 15: The method of any of Clauses 1-14, wherein measuring the uplink signal comprises: performing a received signal strength indicator (RSSI) measurement of the uplink signal in the one or more first symbols in the FD mode; and estimating a self-interference level based on the RSSI measurement.

Clause 16: The method of Clause 15, wherein using the adjusted AGC level during the one or more second symbols to receive the uplink transmission from the UE comprises: adjusting a gain amount at an analog to digital converter (ADC) output of the uplink transmission at the network entity, wherein the amount of gain is based on the RSSI measurement of the uplink signal.

Clause 17: A method for wireless communication by a user equipment (UE), comprising: receiving, from a network entity, signaling to transmit an uplink transmission in one or more first symbols; receiving, from the network entity, an indication to transmit an uplink signal in one or more second symbols for self-interference measurement at the network entity, wherein the uplink signal comprises a random sequence, a preconfigured sequence, or a repetition of a first symbol, of the one or more first symbols of the uplink transmission, and wherein the one or more second symbols are prior to the one or more first symbols, and wherein the one or more first symbols are scheduled for a downlink transmission by the network entity in a full duplex (FD) mode; transmitting the uplink signal in the one or more second symbols; and transmitting the uplink transmission in the one or more first symbols.

Clause 18: The method of Clause 17, wherein the UE receives the indication when at least one of: a local reflector has been removed, added, or changed; or a change in a beam pair used for communication between the network entity and the UE has occurred.

Clause 19: The method of Clause 17 or 18, wherein the UE receives the indication when a threshold amount of time has passed since an FD transmission has occurred between the UE and the network entity.

Clause 20: The method of any of Clauses 17-19, wherein the UE receives the indication to transmit the uplink signal via downlink control information (DCI) scheduling the uplink transmission.

Clause 21: The method of any of Clauses 17-20, wherein the UE receives the indication to transmit the uplink signal via a medium access control (MAC) control element (CE) (MAC-CE) activating the uplink transmission.

Clause 22: The method of any of Clauses 17-21, wherein a number of the one or more first symbols used to transmit the uplink signal is based, at least in part, on a subcarrier spacing (SCS) of at least one of the uplink transmission or the downlink transmission.

Clause 23: The method of any of Clauses 17-22, wherein the one or more first symbols comprise one or more symbols immediately preceding the one or more second symbols.

Clause 24: The method of any of Clauses 17-23, further comprising: receiving, from the network entity in the FD mode, the downlink transmission.

Clause 25: An apparatus including at least one processor and a memory coupled to the at least one processor, the memory and the at least one processor being configured to perform the method of any of Clauses 1-24.

Clause 26: An apparatus including means for performing the method of any of Clauses 1-24.

Clause 27: A computer readable medium storing computer executable code thereon for wireless communications that, when executed by at least one processor, cause an apparatus to perform the method of any of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BS, such as BS 180 may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC network 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit (TX) processor 220 may also generate reference symbols, such as for the primary synchronization signal (PSS), secondary synchronization signal (SSS), PBCH demodulation reference signal (DMRS), and channel state information reference signal (CSI-RS).

TX multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. DL signals from the modulators in transceivers 232a-232t may be transmitted via the antennas 234a-234t, respectively.

At UE 104, antennas 252a-252r may receive the DL signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive (RX) processor 258 may process (e.g., demodulate, deinterleave, and decode) the detected symbols, provide decoded data for UE 104 to a data sink 260, and provide decoded control information to a controller/processor 280.

On the UL, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single carrier-frequency division multiplexing (SC-FDM)), and transmitted to BS 102.

At BS 102, the UL signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively. Scheduler 244 may schedule UEs 104 for data transmission on the DL and/or UL.

5G may utilize OFDM with a cyclic prefix (CP) on the UL and DL. 5G may also support half-duplex operation using time division duplexing (TDD). OFDM and SC-FDM partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 millisecond (ms)) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be CP- OFDM symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (p) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2p slots/subframe. The SCS and symbol length/duration are a function of the numerology. The SCS may be equal to 2¹×15 kHz, where p is the numerology 0 to 5. As such, the numerology p=0 has a subcarrier spacing of 15 kHz and the numerology p=5 has a subcarrier spacing of 480 kHz. The symbol length/duration is inversely related to the SCS. FIGS. 3A-3D provide an example of slot configuration 0 with 14 symbols per slot and numerology p=2 with 4 slots per subframe. The slot duration is 0.25 ms, the subcarrier spacing is 60 kHz, and the symbol duration is approximately 16.67 μs.

A resource grid may be used to represent the frame structure. Each time slot includes an RB (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as RX for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The PDCCH carries downlink control information (DCI) within one or more control channel elements (CCEs), each CCE including nine RE groups (REGs), each REG including four consecutive REs in an OFDM symbol.

A PSS may be within symbol 2 of particular subframes of a frame. The PSS is used by a UE (e.g., 104 of FIGS. 1 and 2) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the PUCCH and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/negative ACK (NACK) feedback. The PUSCH carries data, and may additionally be used to carry a buffer status report (BSR), a power headroom report (PHR), and/or UCI.

Additional Considerations

The preceding description provides examples of configuring resources for measuring cross-link interference in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication, comprising:
   a memory; and
   one or more processors coupled to the memory, the memory and the one or more processors being configured to:
      determine at least one of:
         a local reflector has been removed, added, or changed;
         a change in a beam pair used for communication between the apparatus and a user equipment (UE);
         non-linearities of one or more filters in a transmit (TX) chain or a receive (RX) chain at the apparatus;
         an instantaneous downlink signal transmitted by the apparatus;
         a threshold amount of time has passed since a last measurement was performed by the apparatus for self-interference estimation for FD communications; or
         a threshold amount of time has passed since transmitting a downlink transmission by the apparatus;
      in response to the determining, transmit, to the UE, an indication to transmit an uplink signal in one or more first symbols, wherein the one or more first symbols are prior to one or more second symbols for uplink transmission by the LE, and wherein the one or more first symbols are scheduled for a downlink transmission by the apparatus in a full duplex (FD) mode;
      perform a self-interference measurement of the uplink signal, from the UE, in the one or more first symbols;
      adjust an automatic gain control (AGC) level at the apparatus based on the self-interference measurement; and
      use the adjusted AGC level during the one or more second symbols to receive the uplink transmission from the UE.

2. The apparatus of claim 1, wherein the memory and the one or more processors being configured to transmit the indication to the UE comprises the memory and the one or more processors being configured to transmit the indication to the UE in downlink control information (DCI) scheduling the uplink transmission.

3. The apparatus of claim 1, wherein the memory and the one or more processors being configured to transmit the indication to the UE comprises the memory and the one or more processors being configured to transmit the indication to the UE in a medium access control (MAC) control element (CE) (MAC-CE) activating the uplink transmission.

4. The apparatus of claim 1, wherein the uplink signal comprises a random sequence or a preconfigured sequence.

5. The apparatus of claim 1, wherein the uplink signal comprises a repetition of a first symbol, of the one or more second symbols, of the uplink transmission.

6. The apparatus of claim 1, wherein a number of the one or more first symbols used to transmit the uplink signal is based, at least in part, on a subcarrier spacing (SCS) of at least one of: the uplink transmission, the downlink transmission, or both.

7. The apparatus of claim 1, wherein the one or more first symbols comprise one or more symbols immediately preceding the one or more second symbols.

8. The apparatus of claim 1, wherein the memory and the one or more processors being configured to adjust the AGC level at the apparatus comprises the memory and the one or more processors being configured to adjust the AGC level to mitigate self-interference at the apparatus for full-duplex communications in the second one or more symbols.

9. The apparatus of claim 1, wherein the memory and the one or more processors being configured to use the adjusted AGC level during the second one or more symbols comprises the memory and the one or more processors being configured to engage in full duplex communication including the memory and the one or more processor being configured to, simultaneously in the second one or more symbols:
   apply the adjusted AGC level to receive, from the UE, the uplink transmission; and
   transmit, to a second UE, the downlink transmission in the FD mode.

10. The apparatus of claim 1, wherein the memory and the one or more processors being configured to use the adjusted AGC level during the second one or more symbols comprises the memory and the one or more processors being configured to engage in full duplex communication including the memory and the one or more processor being configured to, simultaneously in the second one or more symbols:
   apply the adjusted AGC level to receive, from the UE, the uplink transmission; and
   transmit, to the UE, the downlink transmission in the FD mode.

11. The apparatus of claim 1, wherein the memory and the one or more processors being configured to perform the self-interference measurement of the uplink signal comprises the memory and the one or more processor being configured to:
   perform a received signal strength indicator (RSSI) measurement of the uplink signal in the one or more first symbols in the FD mode; and
   estimate a self-interference level based on the RSSI measurement.

12. The apparatus of claim 11, wherein the memory and the one or more processors being configured to use the adjusted AGC level during the one or more second symbols to receive the uplink transmission from the UE comprises the memory and the one or more processors being configured to:

adjust a gain amount at an analog to digital converter (ADC) output of the uplink transmission at the apparatus, wherein the amount of gain is based on the RSSI measurement of the uplink signal.

13. A method for wireless communication by a network entity, comprising:

determining at least one of:
- a local reflector has been removed, added, or changed;
- a change in a beam pair used for communication between the network entity and a user equipment (UE);
- non-linearities of one or more filters in a transmit (TX) chain or a receive (RX) chain at the network entity;
- an instantaneous downlink signal transmitted by the network entity;
- a threshold amount of time has passed since a last measurement was performed by the network entity for self-interference estimation for FD communications; or
- a threshold amount of time has passed since transmitting a downlink transmission by the network entity;

in response to the determining, transmitting, to the UE, an indication to transmit an uplink signal in one or more first symbols, wherein the one or more first symbols are prior to one or more second symbols for uplink transmission by the UE, and wherein the one or more first symbols are scheduled for a downlink transmission by the network entity in a full duplex (FD) mode;

performing a self-interference measurement of the uplink signal, from the UE, in the one or more first symbols;

adjusting an automatic gain control (AGC) level at the network entity based on the self-interference measurements in the first one or more m; and using the adjusted AGC level during the one or more second symbols to receive the uplink transmission from the UE.

* * * * *